US008782511B2

(12) United States Patent
Shimizu (10) Patent No.: US 8,782,511 B2
(45) Date of Patent: Jul. 15, 2014

(54) SPREADSHEET CONTROL PROGRAM, SPREADSHEET CONTROL APPARATUS AND SPREADSHEET CONTROL METHOD

(75) Inventor: Ryo Shimizu, Tokyo (JP)

(73) Assignee: Ubiquitous Entertainment Inc., Tokyo (JP)

( * ) Notice: Subject to any disclaimer, the term of this patent is extended or adjusted under 35 U.S.C. 154(b) by 0 days.

(21) Appl. No.: 13/332,433

(22) Filed: Dec. 21, 2011

(65) Prior Publication Data

US 2012/0260152 A1  Oct. 11, 2012

(30) Foreign Application Priority Data

Mar. 1, 2011  (JP) ................. 2011-044554

(51) Int. Cl.
*G06F 17/00* (2006.01)
*G06F 3/0488* (2013.01)
*G06F 17/24* (2006.01)

(52) U.S. Cl.
CPC .......... *G06F 3/04883* (2013.01); *G06F 17/246* (2013.01); *G06F 17/245* (2013.01)
USPC ............ 715/217; 715/211; 715/212; 382/203

(58) Field of Classification Search
CPC .................................................. G06F 17/246
USPC ......................................................... 715/217
See application file for complete search history.

(56) References Cited

U.S. PATENT DOCUMENTS

| | | | | |
|---|---|---|---|---|
| 5,581,677 A | * | 12/1996 | Myers et al. | 345/440 |
| 5,923,323 A | * | 7/1999 | Chiu et al. | 715/767 |
| 6,525,749 B1 | * | 2/2003 | Moran et al. | 715/863 |
| 6,678,865 B1 | * | 1/2004 | Pratley et al. | 715/220 |
| 7,318,192 B1 | * | 1/2008 | Hobbs et al. | 715/212 |
| 7,612,776 B2 | * | 11/2009 | Hobbs | 345/441 |
| 2009/0245654 A1 | * | 10/2009 | Xing et al. | 382/203 |

FOREIGN PATENT DOCUMENTS

| | | | | |
|---|---|---|---|---|
| EP | 854434 A1 | * | 7/1998 | G06K 9/20 |
| JP | 2010-515978 A | | 5/2010 | |
| JP | 2010-532535 A | | 10/2010 | |
| WO | WO-2008/086218 A2 | | 7/2008 | |
| WO | WO-2009/006074 A1 | | 1/2009 | |

OTHER PUBLICATIONS

University of Arizona, User Guide—Software/Hardware Module: Microsoft Excel XP, Aug. 2002, Arizona Board of Regents, pp. 5, 6, and 12.*

* cited by examiner

*Primary Examiner* — Cesar Paula
*Assistant Examiner* — Mohammed-Ibrahim Zuberi
(74) *Attorney, Agent, or Firm* — Novak Druce Connolly Bove + Quigg LLP (57) ABSTRACT

Lines drawn on a touch screen with an inputting window opened are recognized as ruled lines which are parallel with a row or column of a spreadsheet, and a square formed by the ruled lines is set to a cell in the spreadsheet when the square is formed. Consequently, it is possible to create the spreadsheet when a user of a computer simply draws a line with a fingertip or the like over the touch screen, and furthermore, it is also possible to input a value to the cell by specifying the square part drawn with the lines to carry out an operation for inputting data. Thus, there is provided a spreadsheet creating interface which makes the most of a visibility and an operability of the touch screen.

10 Claims, 8 Drawing Sheets

SPREADSHEET CONTROL PROGRAM, SPREADSHEET CONTROL APPARATUS AND SPREADSHEET CONTROL METHOD

CROSS-REFERENCE TO RELATED APPLICATIONS

This Application claims priority from Japanese Patent Application No. 2011-044554, filed Mar. 1, 2011, the entire contents of which is herein incorporated by reference.

BACKGROUND OF THE INVENTION

1. Field of the Invention

The present invention relates to a spreadsheet control program, a spreadsheet control apparatus and a spreadsheet control method which serve to control a creation or edit of a spreadsheet or an input/output of data in a computer including a touch screen such as a smartphone or a tablet PC.

2. Description of the Related Art

With a diffusion of a PC (personal computer), a spreadsheet to be created in spreadsheet software can be utilized for various uses. In order to efficiently carry out a work for creating or editing the spreadsheet, a common function is provided as a template (for example, see Patent Document 1, paragraph 0004 or the like).

On the other hand, in recent years, a spreadsheet is also utilized in a portable device having a computer function, for example, a smartphone or a tablet PC in addition to a PC. In the smartphone or the tablet PC, a touch screen is often used for inputting/outputting data. In order to cope with an execution of an operation for various documents including the spreadsheet over the touch screen, however, there is disclosed the invention for improving an operation such as a movement of the document or a visibility (for example, see Patent Document 2).

Patent Document 1: Japanese Laid-Open Patent Publication No. 2010-532535
Patent Document 2: Japanese Laid-Open Patent Publication No. 2010-515978

DISCLOSURE OF THE INVENTION

As in the invention described in the Patent Document 2, a comfortableness to an operation for a document including a spreadsheet over a touch screen is pursued. The pursuit is mostly intended for enhancing an operability or a visibility in a display of a generated document.

In order to enhance an operability for inputting data in a creation or edit of a document, a method of accepting an input in a touch with a keyboard displayed on a touch screen is provided, for example. The enhancement in the operability of the input through the keyboard cannot cope with an operation for creating or editing a table intended for a spreadsheet. Referring to the creation or edit of the spreadsheet, similarly, there is demanded a mechanism for making the most of a peculiar visibility to the touch screen.

The invention has been made in order to solve the problems and has an object to provide a spreadsheet control program, a spreadsheet control apparatus and a spreadsheet control method which make the most of a visibility of a touch screen and is excellent in an operability in a creation or edit of a spreadsheet, or an input/output of data in a computer including a touch screen such as a smartphone or a tablet PC.

In order to achieve the object, the invention provides a spreadsheet control program for controlling a spreadsheet in a computer including a touch screen, the program causing the computer to execute a line detecting step of detecting a line drawn on a predetermined window of the touch screen, a ruled line recognizing step of recognizing the line detected at the line detecting step as a ruled line which is parallel with a transverse or vertical ruled line corresponding to a row or column of the spreadsheet to be displayed on the window, a cell setting step of setting, to a single cell in the spreadsheet, a region in which a square formed by intersection points of the ruled lines recognized at the ruled line recognizing step is displayed when the square is formed, and an input value accepting step of accepting data specifying the region set to the cell at the cell setting step as a value input to the cell over the spreadsheet when the data are input.

In the invention, the lines drawn on the touch screen with the inputting window opened are recognized as the ruled lines which are parallel with the row or column of the spreadsheet, and the square formed by the ruled lines is set to the cell in the spreadsheet when the square is formed. Consequently, it is possible to create the spreadsheet by simply causing a user of the computer to draw a line with a fingertip or the like over the touch screen, and it is also possible to input a value to the cell by specifying the square part drawn with the lines to carry out an operation for inputting data. Thus, there is provided an interface for creating the spreadsheet making the most of a visibility and an operability of the touch screen.

In the invention, a smartphone, a tablet PC or the like capable of inputting/outputting data by operating the touch screen is equivalent to the computer including the touch screen. In the invention, moreover, it is necessary to recognize at least two ruled lines in transverse and vertical directions respectively in order to form at least one square. In a stage in which a first square is formed so that a cell is set, a spreadsheet is started to be newly created.

Furthermore, the invention can also be characterized in that when a height or width of a square formed newly is different from that of an adjacent cell which is previously set, a height or width of a cell corresponding to the square formed newly is set in such a manner that a height or width which is different from that of another adjacent cell is equal to that of the another adjacent cell at the cell setting step.

By setting the height or width of the cell as described above, it is possible to automatically create a spreadsheet in which heights of rows and widths of columns are uniform even if a variation is caused in an interval between the lines drawn on the touch screen.

In addition, the invention may be characterized in that when a height or width of a square formed newly is different from that of an adjacent cell which is previously set beyond a predetermined range, a height or width of a cell corresponding to the square formed newly is set in such a manner that a height or width which is different from that of another adjacent cell is different from that of the another adjacent cell at the cell setting step.

As described above, by setting the cell having a double height if the height of the square formed newly exceeds a double of the height of the adjacent cell and setting a cell having a half height if the height is equal to or smaller than a half of the height of the adjacent cell, for example, it is possible to carry out an implementation by a simple operation for changing the interval between the lines to draw a new line also in the case in which a user supposes to intentionally create a row or column which has a different height or width from that of the other row or column.

Moreover, the invention may be characterized in that the computer is caused to execute a deleting line detecting step of detecting a deleting line which is drawn to transversely or vertically cross a region set to be a cell on the spreadsheet to be displayed on the window and meets a predetermined condition, and a deleting step of deleting a row belonging to the cell when the deleting line detected at the deleting line detecting step is drawn to transversely cross the region set to be the cell, and a column belonging to the cell when the deleting line is drawn to vertically cross the region set to be the cell. The invention may be characterized in that a predetermined condition for the deleting line to be detected at the deleting line detecting step indicates a line drawn on a region corresponding to cells belonging to an identical row or column, and a wavy line covering a range of at least a predetermined ratio of a height of the cell and at least a predetermined number of cells in a total number of cells in the row if the cells belong to the identical row and a wavy line covering a range of at least a predetermined ratio of a width of the cell and at least a predetermined number of cells in a total number of cells in the column if the cells belong to the identical column.

As described above, for example, it is also possible to offer an interface making the most of a visibility and an operability of the touch screen to the function for deleting a row or column by executing the processing for deleting a row of the spreadsheet displayed on the window of the touch screen by drawing a wavy line which transversely crosses the row.

Furthermore, the invention may be characterized in that the computer is caused to execute a dividing line detecting step of detecting a dividing line which is drawn to transversely or vertically cross a region set to be a cell on the spreadsheet to be displayed on the window and meets a predetermined condition, and a cell dividing step of dividing a single cell in which the dividing line is drawn over the region at the dividing line detecting step into two cells including a cell which takes over a value input to the single cell. The invention may be characterized in that the predetermined condition for the dividing line to be detected at the dividing line detecting step indicates a line drawn on a region corresponding to cells belonging to an identical row or column, and a straight line drawn from the cell subjected to numbering for a row to the cell on a most end at a reverse side if the cells belong to the identical row and a straight line drawn from the cell subjected to numbering for a column to the cell on a most end at a reverse side if the cells belong to the identical column.

As described above, for example, it is also possible to offer an interface making the most of a visibility and an operability of the touch screen to the function for dividing a row or column by executing the processing for dividing a row of the spreadsheet displayed on the window of the touch screen by drawing a straight line which transversely crosses the row.

Moreover, the invention may be characterized in that the computer is caused to execute a ruled line selecting step of accepting a selection of a ruled line breaking a row or column of a spreadsheet displayed on the window, and a cell unifying step of unifying two cells broken through a first ruled line accepted to be selected at the ruled line selecting step into a single cell when detecting that the first ruled line is moved to a position for an overlap with a second ruled line which is adjacent thereto.

As described above, by causing a user to carry out the operation for moving the ruled line breaking the row or column over the window of the touch screen to unify two adjacent cells in the same manner as a state of a displayed table if the ruled line thus moved overlaps with the adjacent ruled line, it is also possible to offer an interface making the most of a visibility and an operability of the touch screen to the function for unifying adjacent rows or columns.

Furthermore, the invention may be characterized in that the computer is caused to execute a ruled line selecting step of accepting a selection of a ruled line breaking a row or column of a spreadsheet displayed on the window, and a cell changing step of changing a height of a cell and numbering for a row if a first ruled line accepted to be selected at the ruled line selecting step is a transverse line and changing a width of the cell and numbering for a column if the first ruled line is a vertical line when detecting that the first ruled line is moved to a position placed beyond a second ruled line which is adjacent thereto.

As described above, by causing a user to carry out the operation for moving the ruled line breaking the row or column over the window of the touch screen to change the height or width of the cell and the numbering in the same manner as the state of the displayed table if the ruled line is moved to the position placed beyond the adjacent ruled line, it is also possible to offer an interface making the most of a visibility and an operability of the touch screen to the function for regulating the height of the row or the width of the column.

Moreover, the invention may be characterized in that the computer is caused to execute a ruled line selecting step of accepting a selection of a ruled line breaking a row or column of a spreadsheet displayed on the window, and a numbering changing step of shifting a column subjected to numbering for a row in a rightward direction to change numbering for a column when detecting that a left end of a ruled line accepted to be selected at the ruled line selecting step is moved beyond the column subjected to the numbering for a row if the ruled line is a transverse line, and shifting the row subjected to the numbering for a column in a downward direction to change the numbering for a row when detecting that an upper end of the ruled line accepted to be selected at the ruled line selecting step is moved beyond the row subjected to the numbering for a column if the ruled line is a vertical line.

As described above, by causing a user to carry out the operation for moving the ruled line breaking the row or column over the window of the touch screen to move the row or column subjected to the numbering in a direction in which the line is shifted if the end of the ruled line is moved to the position placed beyond the row or column subjected to the numbering, it is also possible to offer an interface making the most of a visibility and an operability of the touch screen to the function for shifting and regulating the position of the row or column of the spreadsheet.

The invention can also be specified as a spreadsheet control apparatus including the spreadsheet control program according to the invention.

In other words, the invention provides a spreadsheet control apparatus including a touch screen capable of inputting/outputting data, line detecting means for detecting a line which is drawn on a predetermined window of the touch screen, ruled line recognizing means for recognizing the line detected by the line detecting means as a ruled line which is parallel with a transverse or vertical ruled line corresponding to a row or column of a spreadsheet to be displayed on the window, cell setting means for setting, to a single cell in the spreadsheet, a region in which a square formed by intersection points of the ruled lines recognized by the ruled line recognizing means is displayed when the square is formed, and input value accepting means for accepting data specifying the region set to the cell by the cell setting means as a value which is input to the cell over the spreadsheet when the data are input.

The spreadsheet control apparatus according to the invention may include various requirements for the spreadsheet control program according to the invention described above.

The invention can also be specified as a spreadsheet control method to be executed in accordance with the spreadsheet control program according to the invention.

In other words, the invention provides a spreadsheet control method of controlling a spreadsheet through a computer having a touch screen, including a line detecting step of causing the computer to detect a line drawn on a predetermined window of the touch screen, a ruled line recognizing step of causing the computer to recognize the line detected at the line detecting step as a ruled line which is parallel with a transverse or vertical ruled line corresponding to a row or column of a spreadsheet to be displayed on the window, a cell setting step of causing the computer to set, to a single cell in the spreadsheet, a region in which a square formed by intersection points of the ruled lines recognized at the ruled line recognizing step is displayed when the square is formed, and an input value accepting step of causing the computer to accept data specifying the region set to the cell at the cell setting step as a value input to the cell over the spreadsheet when the data are input.

The spreadsheet control method according to the invention may have various requirements for the spreadsheet control program according to the invention described above.

The invention provides an input interface of a spreadsheet which makes the most of a visibility of a touch screen and is also excellent in an operability in a creation or edit of a spreadsheet, or an input/output of data in a computer including a touch screen such as a smartphone or a tablet PC. Consequently, it is possible to easily treat the spreadsheet in both the smartphone and the tablet PC. Thus, it is possible to expect an enhancement in a convenience of a user.

DETAILED DESCRIPTION OF THE PREFERRED EMBODIMENTS

An embodiment according to the invention will be described below in detail with reference to the drawings. The following description is only illustrative for the embodiment according to the invention and the invention is not restricted to the embodiment.

Figure 1:
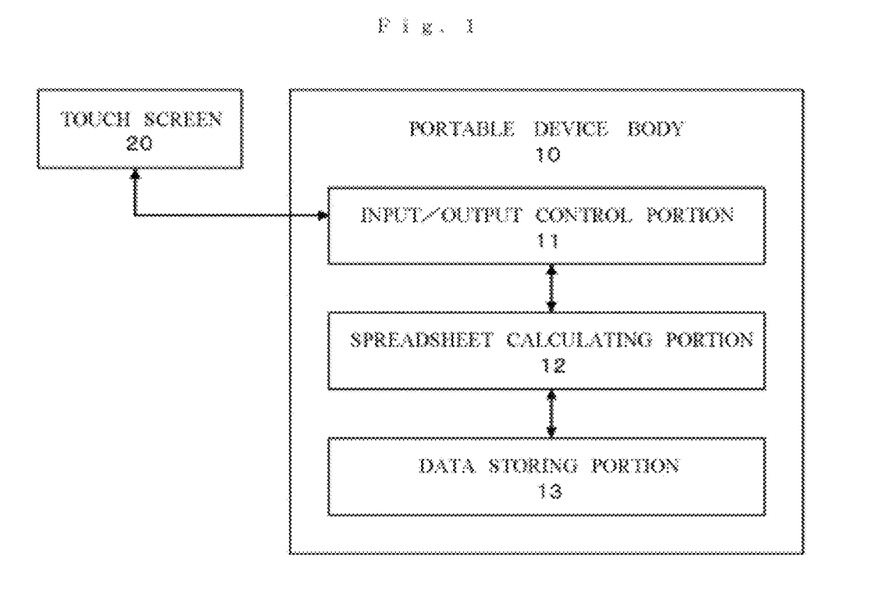
FIG. 1 is a diagram showing a structure of a portable device in which a spreadsheet control program is operated according to the invention.

FIG. 1 shows a structure of a portable device in which a spreadsheet control program is operated according to the invention. Although portable devices of a touch screen type such as a smartphone or a tablet PC are used in the invention, hardware for carrying out the invention is not restricted to the devices but it is sufficient to use a computer capable of inputting/outputting data through a touch screen and creating or editing a spreadsheet.

There is employed a structure capable of inputting/outputting data to/from a portable device body 10 by using an apparatus including another input/output device together with a touch screen 20 or by using the touch screen 20. A result of a calculation in the portable device body 10 is displayed on the touch screen 20, and furthermore, the touch screen 20 is tapped with a fingertip or a pen or a line is drawn to input data to the touch screen 20.

The portable device body 10 is a computer including a CPU, a main memory or an auxiliary storage device such as an HDD. Both an input/output control portion 11 and a spreadsheet calculating portion 12 which are provided in the portable device body 10 are functionally specified. An application program corresponding to each function is read from the auxiliary storage device to a main memory and a calculation processing is executed by a CPU so that a predetermined function is implemented.

The spreadsheet calculating portion 12 has a function for creating or editing a spreadsheet and is compatible with general spreadsheet software, and data are input/output by the input/output control portion 11 through the touch screen 20.

The input/output control portion 11 serves as an interface in a use of the spreadsheet calculating portion 12 and corresponds to a spreadsheet control program according to the invention. The input/output control portion 11 has a function for recognizing a point or a line drawn with a fingertip or a pen and displaying the same point or line on a window opened over the touch screen 20 in order to operate a spreadsheet which is compatible with a so-called "handwriting memorandum" application, and furthermore, a function for setting a cell or accepting a value input to a cell and transferring the input value to the spreadsheet calculating portion 12 and a function for outputting the spreadsheet edited by the spreadsheet calculating portion 12 and displaying the spreadsheet on the window opened over the touch screen 20 and the like as an interface of the spreadsheet calculating portion 12.

A predetermined storage area of the auxiliary storage device is allocated to a data storing portion 13 and data on the spreadsheet including a value input to each cell are stored therein. The data are read onto the main memory in the creation or edit of the spreadsheet or the like so that the spreadsheet is displayed on the window which is opened over the touch screen 20.

On the assumption of the structure described above, an operation of the spreadsheet control program according to the invention will be explained by using an example of a ruled line, a spreadsheet or the like displayed on a window which is opened over a touch screen shown in FIGS. 2 to 15.

In the case in which the creation or edit of a spreadsheet, the input of a value or the like is to be carried out by using the spreadsheet control program according to the invention, an application corresponding to the input/output control portion 11 is started to open a window for operating the spreadsheet over the touch screen 20. A user that wants to create the spreadsheet draws, with a fingertip or a pen, a line to be a ruled line of the spreadsheet over the window as illustrated in the example of FIG. 2.

Figure 2:
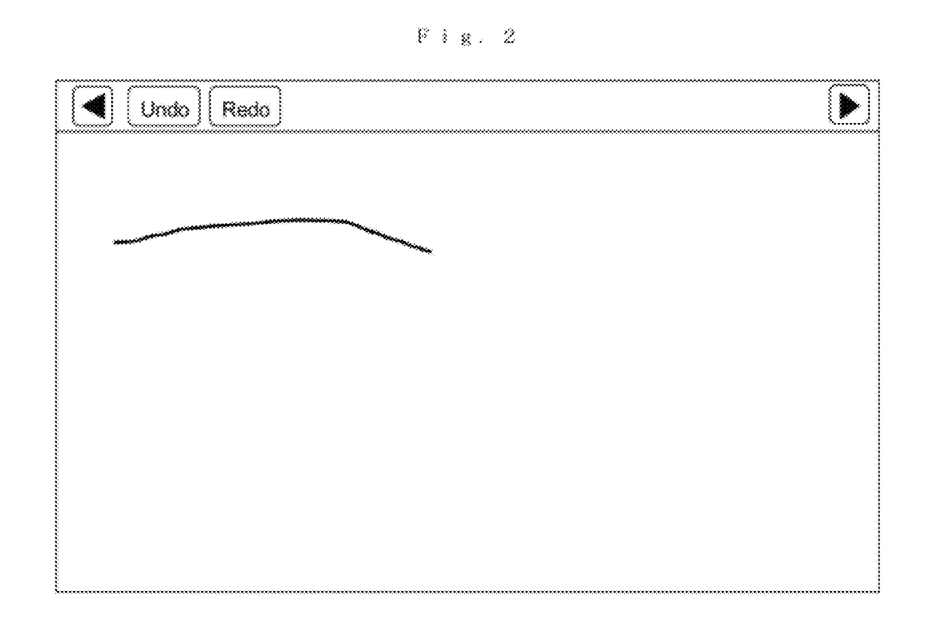
FIG. 2 is a first view showing a procedure for recognizing a line drawn on a window as a ruled line in accordance with the spreadsheet control program according to the invention.

In the example of FIG. 2, a slightly curved line is drawn on the window. There is carried out a processing for correcting a line in order to recognize the drawn line as a ruled line which is parallel with a transverse or vertical ruled line which corresponds to a row or column of a spreadsheet.

Figure 3:
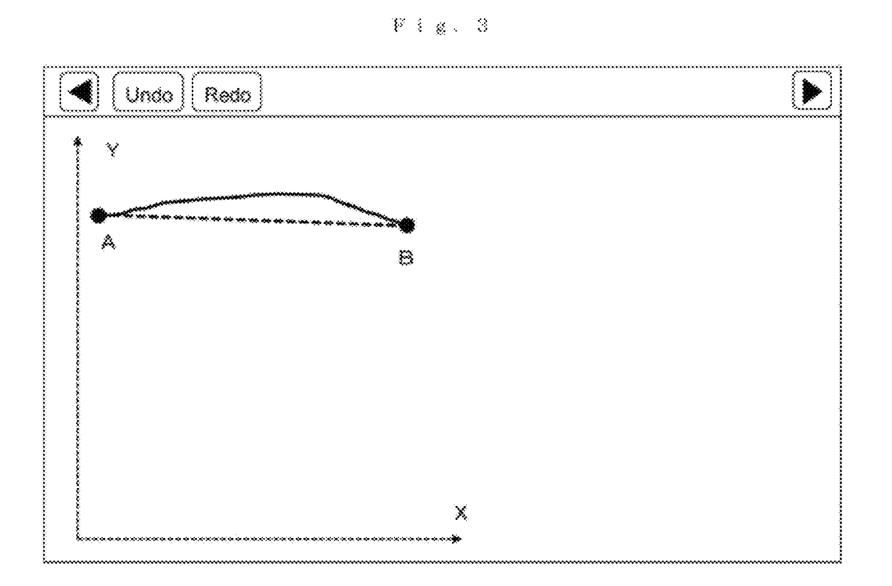
FIG. 3 is a second view showing the procedure for recognizing a line drawn on a window as a ruled line in accordance with the spreadsheet control program according to the invention.

FIG. 3 shows an example of the processing for correcting the drawn line. First of all, both ends (A and B) of the drawn line are connected to each other through a straight line (a line shown in a dotted line of FIG. 3). In the opened window, X and Y axes to be coordinate axes for setting the row and the column are determined in the case in which the spreadsheet is created (the coordinate axes are not displayed on the window). Referring to the straight line connecting the both ends of the drawn line, an angle formed by the X and Y axes is calculated to ascertain any gradient to which they approximate (whether or not the angle is equal to or smaller than 45° with respect to the X axis, for example), and it is determined whether the drawn line is set to be a ruled line which is parallel with a transverse or vertical ruled line corresponding to the row or column of the spreadsheet (for example, the drawn line is set to be the transverse line if the angle is equal to or smaller than 45° with respect to the X axis, and is set to be the vertical line if the angle exceeds 45°).

Figure 4:
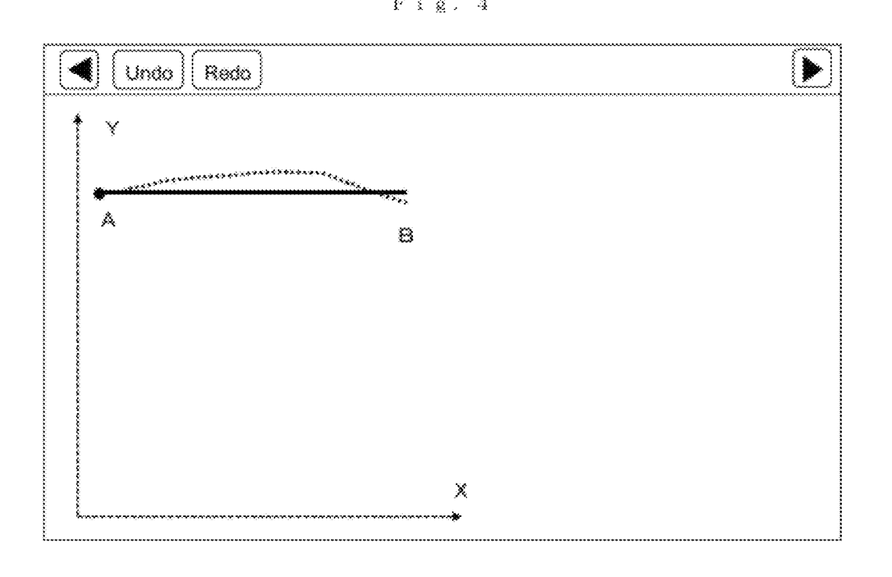
FIG. 4 is a third view showing the procedure for recognizing a line drawn on a window as a ruled line in accordance with the spreadsheet control program according to the invention.

As shown in the example of FIG. 4, when it is determined that the drawn line is the ruled line which is parallel with the transverse ruled line corresponding to the row of the spreadsheet, the drawn line (the dotted line connecting A and B) with A on a left end set to be a starting point is corrected into a ruled line (a solid line with A set to be the starting point) which is parallel with the transverse ruled line corresponding to the row of the spreadsheet and is thus recognized. Consequently, the line drawn on the window is recognized as the ruled line which is parallel with the transverse or vertical ruled line corresponding to the row or column of the spreadsheet, and the corrected line is displayed on the window.

The method described above is only illustrative as a method of recognizing a ruled line, and a method of recognizing, as a ruled line, a line drawn with a fingertip or a pen according to the invention is not restricted to the method described above. Moreover, all of the lines drawn on the window are not recognized as the ruled lines. In the case in which a gradient is equal to or greater than a certain gradient or the case in which a length of the line is equal to or smaller than a certain length, the line may be treated as an input error without a recognition as both of the transverse and vertical ruled lines.

Figure 5:
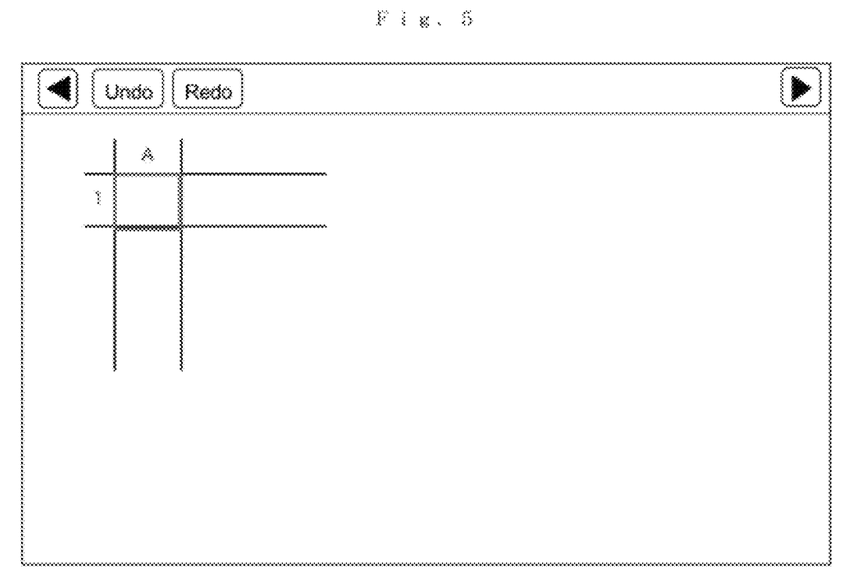
FIG. 5 is a view showing a state in which a cell is set to a spreadsheet in accordance with the spreadsheet control program according to the invention.

When ruled lines are recognized so that at least one square is formed by intersection points of the ruled lines as shown in FIG. 5, subsequently, the spreadsheet calculating portion 12 is started so that a spreadsheet is started to be newly created. A single cell in the newly created spreadsheet is set to the region in which the square is displayed and a row and a column which correspond to the cell are subjected to numbering (a first row and an A column).

Values of a height and a width of the cell to be set, that is, a height of the row and a width of the column are not particularly restricted but a height and a width of the formed square may be used exactly or may be replaced with a height and a width of a standard format of a spreadsheet which is preset to a program or the like. However, it is preferable that maximum and minimum values should be determined for the height and width of the set cell in order to prevent a size of the cell from being unbalanced in relation to a size of the window.

When a line drawn newly on the window by a user is recognized as a transverse or vertical ruled line so that a new square is formed, furthermore, a cell is also set to the square and numbering for a corresponding row or column is added. In other words, in the case in which a spreadsheet is started to be created and a new transverse ruled line is then recognized, a single row is formed by a cell set through the transverse line so that a single row is added to the spreadsheet. In the case in which a new vertical line is recognized, a single column is formed by a cell set through the vertical line so that a single column is added to the spreadsheet.

A way for setting a height of a new row or a width of a new column (a height or width of a cell) in an addition of the row or column is not particularly restricted. The height of the row or the width of the column may be set to have an identical value to a height or width of an adjacent cell. In the case in which a height or width of a square formed by a newly drawn line is different from that of the adjacent cell beyond a certain range, moreover, it is also possible to set a different height or width from that of the adjacent cell. For example, a double height or width may be set if the height or width is at least a double of that of the adjacent cell, a half height or width may be set if the height or width is equal to or smaller than a half of that of the adjacent cell, and an identical height or width to that of the adjacent cell may be set in the other cases.

Figure 6:
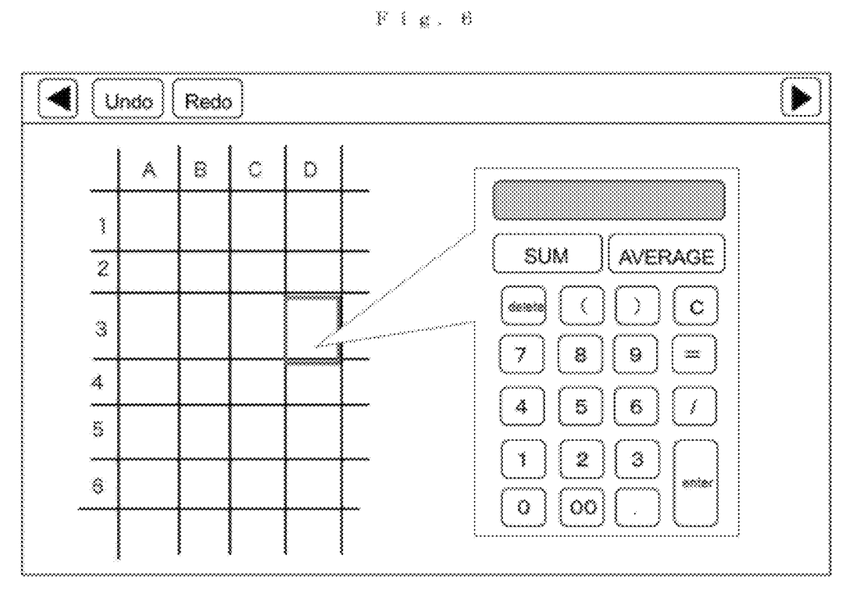
FIG. 6 is a view showing a state in which data are input to the cell of the spreadsheet in accordance with the spreadsheet control program according to the invention.

FIG. 6 shows a state in which seven transverse lines and five vertical lines are recognized as ruled lines and a spreadsheet in a matrix of six rows by four columns is created and displayed on a window. Each square constituting the matrix is equivalent to a cell of the spreadsheet. When a single cell is selected by an operation for tapping the touch screen 20 or the like through the window (a cell in an address of "D3" is selected in FIG. 6), a screen of a calculator, a keyboard, a ten key or the like is displayed in such a manner that data can be input to the cell.

A user can input the data to the cell by tapping the screen of the calculator, the keyboard or the like. The input data are transferred, to the spreadsheet calculating portion 12, as an input value to the selected cell and are stored in a memory or the like.

Figure 7:
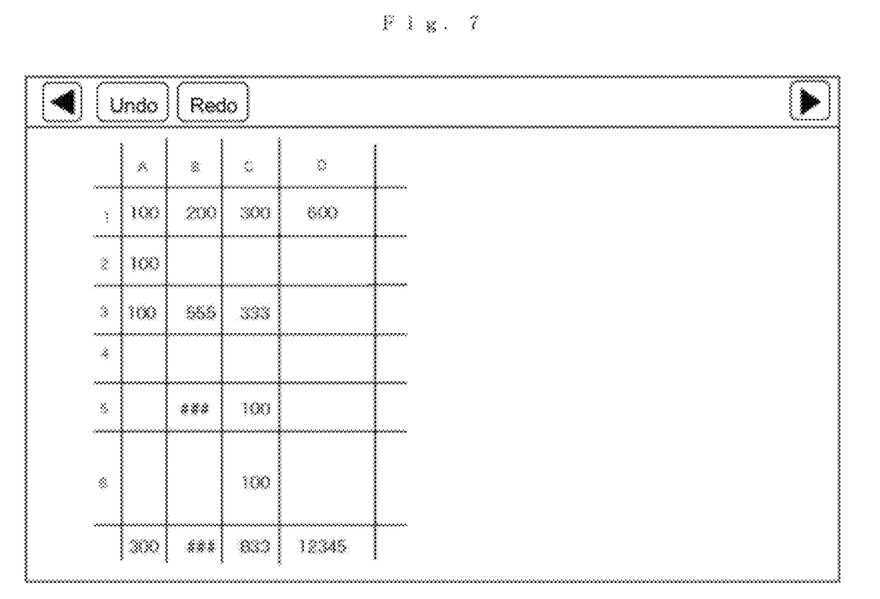
FIG. 7 is a view showing a state brought after inputting the data to the spreadsheet in accordance with the spreadsheet control program according to the invention.

FIG. 7 shows a state brought after data are input to the cells of the spreadsheet. Each input value is stored in association with an ID of a cell (a cell address) having a numeric value displayed (for example, an input value of "100" is associated with a cell ID of "A1"). When the user carries out an operation for saving a spreadsheet, an input value is associated with each cell ID (an address of a cell) so that a spreadsheet in which a height of a row and a width of a column are specified is stored in the data storing portion 13 in a file format.

Figure 8:
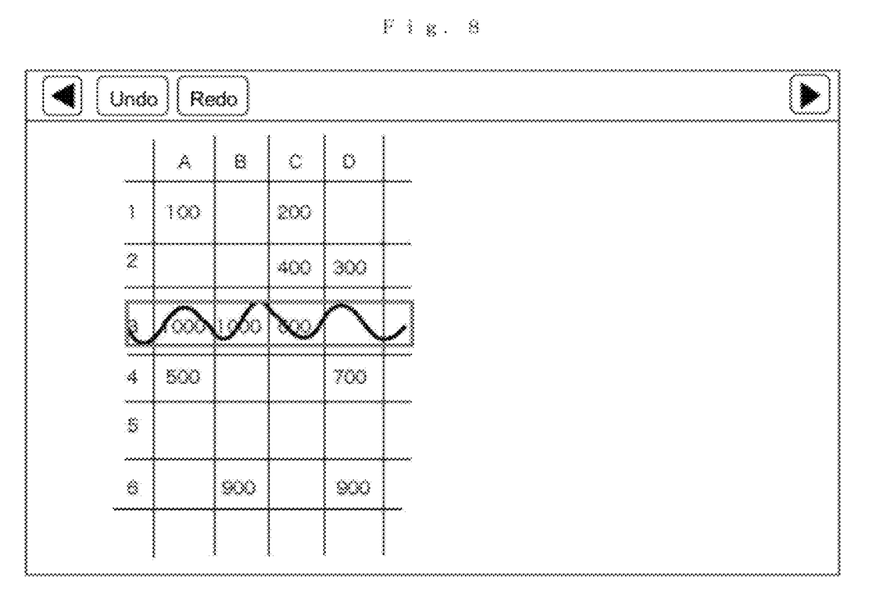
FIG. 8 is a view showing a state in which a wavy line is drawn in order to delete a row of the spreadsheet in accordance with the spreadsheet control program according to the invention.
Figure 9:
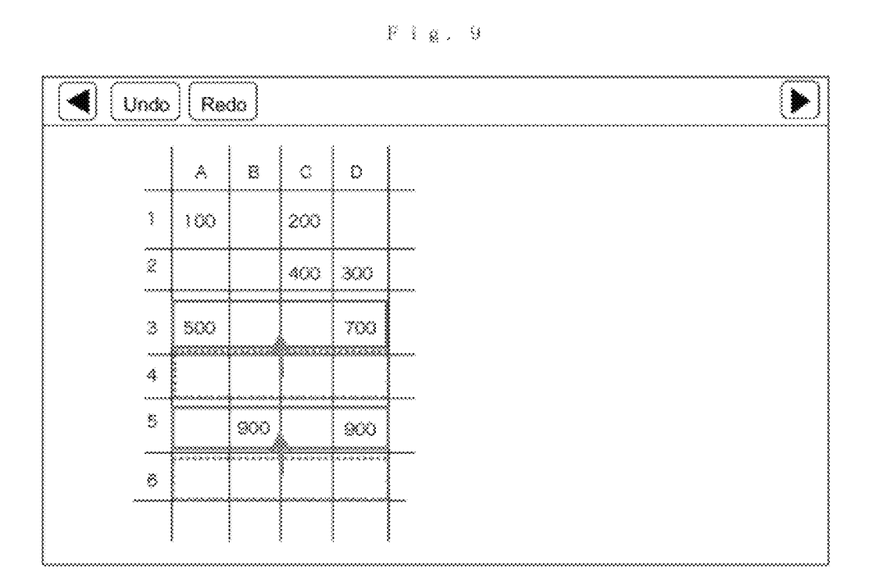
FIG. 9 is a view showing a state in which the row of the spreadsheet is deleted in accordance with the spreadsheet control program according to the invention.

FIGS. 8 and 9 show an example in which a wavy line is drawn on a spreadsheet to delete a row. In the case in which a row or column of the created spreadsheet is to be deleted, a user draws a line (a deleting line) defined to be a line for deleting the row or column in the row or column to be deleted. In the example of FIG. 8, the deleting line is defined to be a wavy line and the touch screen 20 is traced with a fingertip or a pen to draw a wavy line in order to delete a third row.

When it is detected that a wavy line which transversely or vertically crosses a cell constituting any of rows or columns of the spreadsheet is drawn in a region corresponding to the row or column in the touch screen 20, a processing for deleting a row or column including a cell having the wavy line drawn thereon is executed. In other words, there is executed a processing for erasing an input value of a cell present in a deleted row or column and changing numbering for a row or column in order to upward move rows under a deleted row if the row is deleted and leftward move columns on the right of a deleted column if the column is deleted, and moving the input value to a position after the change of the numbering in order to correspond to an ID of each cell. The results of the processings are transferred to the spreadsheet calculating portion 12 and are reflected in a file of the spreadsheet.

In the example of FIG. 9, all of input values of the cells in the third row which are deleted are erased and input values present in a fourth row are moved to the third row (for example, "500" in "A4" is moved to "A3") and input values in a sixth row are moved to a fifth row (for example, "900" in "B6" is moved to "B5").

A way for deciding a line corresponding to any condition which is detected as a wavy line corresponding to a deleting line if any is not particularly restricted. For example, however, a decision may be made on the condition that the line is a line drawn in a corresponding region to cells belonging to an identical row or column and is a line in a range of at least a predetermined ratio of a height of the cell (which covers at least a half of a height of the cell in the same row, for example) and covering at least a predetermined number of cells in the total number of cells in the same row (which covers at least a half of the number of the cells in the same row, for example) if the cells belong to the identical row, and is a line in a range of at least a predetermined ratio of a width of the cell (which covers at least a half of the width of the cell in the same column, for example) and a line covering at least a predetermined number of cells in the total number of cells in the same column (which covers at least a half of cells in the number of cells in the same column, for example) if the cells belong to the identical column, for instance.

Figure 10:
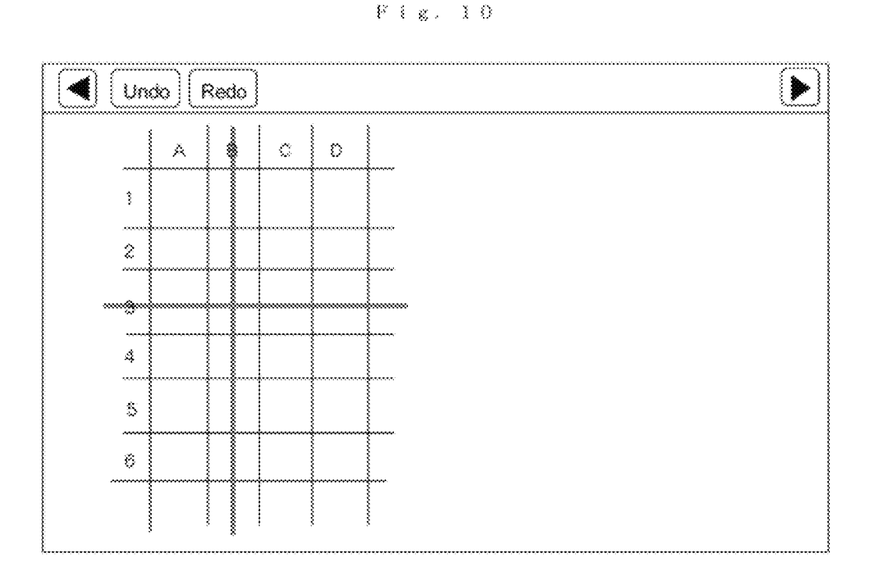
FIG. 10 is a view showing a state in which a straight line is drawn in order to divide a row and a column of the spreadsheet in accordance with the spreadsheet control program according to the invention.
Figure 11:
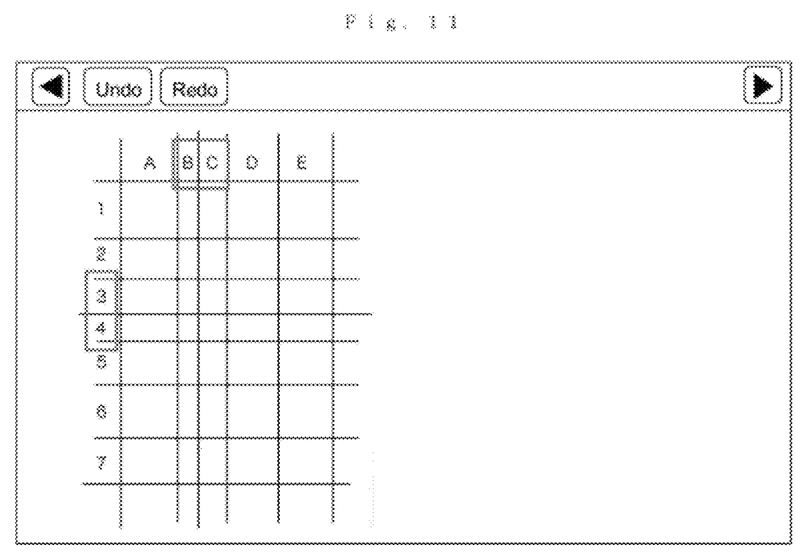
FIG. 11 is a view showing a state in which the row and the column of the spreadsheet are divided in accordance with the spreadsheet control program according to the invention.

FIGS. 10 and 11 show an example in which a straight line is drawn on a spreadsheet to divide a row and a column. In the case in which the row or column of the created spreadsheet is to be divided, a user draws a line (a dividing line) defined as a line for dividing a row or column to be divided on the row or column. In the example of FIG. 10, the dividing line is defined as a straight line and the touch screen 20 is traced with a fingertip or a pen to draw a straight line in order to divide a third row and a B column.

When it is detected that a straight line which transversely or vertically crosses a cell constituting any of rows or columns of the spreadsheet is drawn in a region corresponding to the row or column in the touch screen 20, a processing for dividing a row or column including a cell having the straight line drawn thereon is executed. In other words, there is executed a processing for changing numbering for a row when the row is divided and moving an input value to a position after the change of the numbering in order to correspond to an ID of each cell in the divided row or column. These processing results are transferred to the spreadsheet calculating portion 12 and are reflected in a file of the spreadsheet.

In the example of FIG. 11, a third row is divided into two rows and the numbering is carried out for the divided rows as third and fourth rows. If an input value is present in "A3", it is taken over to a cell in an upper stage which is divided (new "A3"). If the input value is present in "A4" which has not been divided, moreover, a display position of the displayed input value is moved to a cell in an address of "A4" in a lower stage which is divided. Similarly, a B column is also divided into two columns and the numbering is carried out for the divided columns as B and C columns. If the input value is present in "B2", it is taken over to a left cell which is divided (new "B 1"). If the input value is present in "C2" which has not been divided, furthermore, a display position of the displayed input value is moved to a cell in an address of "C1" on a right side which is divided.

A way for deciding a line corresponding to any condition which is detected as a straight line corresponding to a dividing line if any is not particularly restricted. For example, however, a decision may be made on the condition that the line is a line drawn in a corresponding region to cells belonging to an identical row or column, and a straight line drawn from the cell subjected to numbering for a row to the cell on a rightmost end at a reverse side if the cells belong to the identical row and a straight line drawn from the cell subjected to numbering for a column to the cell on a lowermost end at a reverse side if the cells belong to the identical column, for example.

On the assumption that the straight line corresponding to the dividing line is strictly set to be a straight line, moreover, it is supposed that an operability is hindered. For example, therefore, it may be decided that the drawn line is the straight line on the condition that a difference between maximum and minimum values in a Y coordinate of the line should be within a certain range if the line serves to delete a row, or a difference between maximum and minimum values in an X coordinate of the line should be within a certain range if the line serves to delete a column.

FIGS. 12 to 15 show an example in which a ruled line of a spreadsheet is moved to regulate a size of a row or column. In the case in which a size such as a height of a row or a width of a column in a created spreadsheet is to be regulated, a user selects a ruled line for breaking the row or column of which size is to be regulated through a predetermined operation (an operation for displaying, on a window, an icon of an item of which ruled line is to be moved and touching the ruled line in a state in which the icon of the item is selected or the like) and moves the selected ruled line through dragging over the window.

Figure 12:
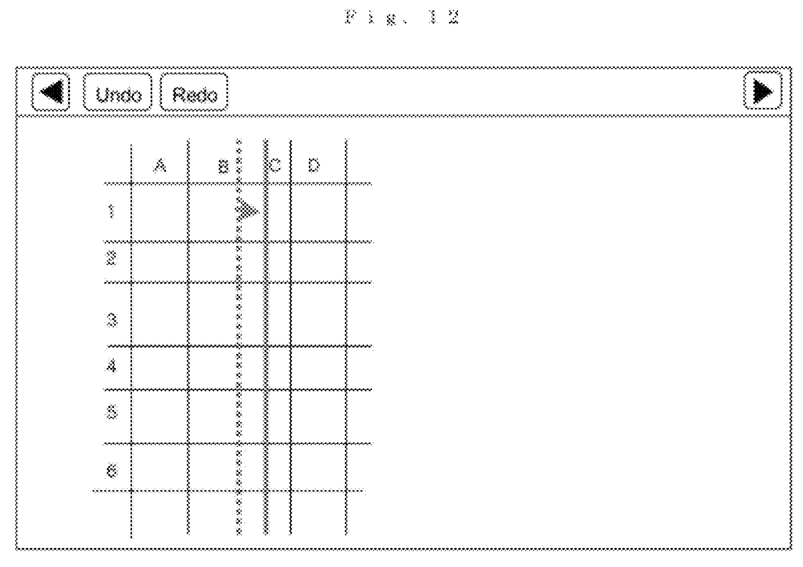
FIG. 12 is a view showing a state in which a ruled line is moved in order to change a width of the column of the spreadsheet in accordance with the spreadsheet control program according to the invention.
Figure 13:
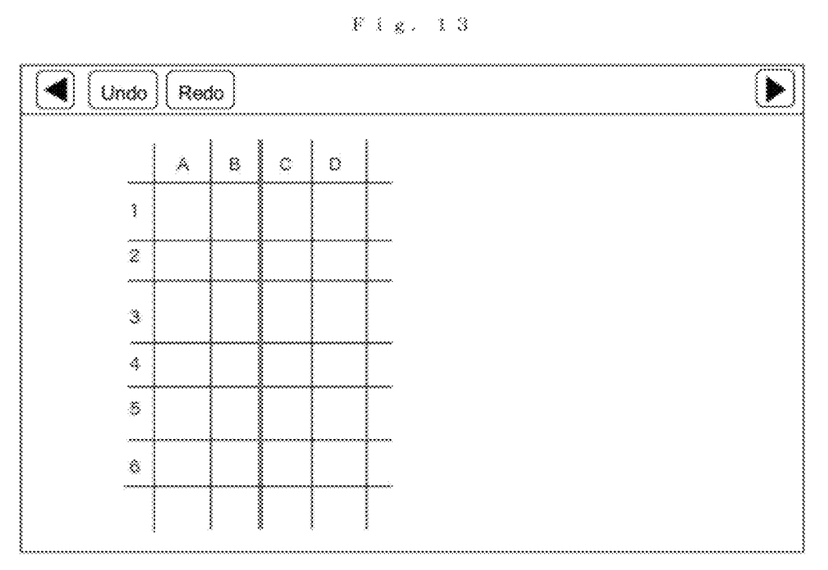
FIG. 13 is a view showing a state in which the ruled line is moved in order to unify the column of the spreadsheet in accordance with the spreadsheet control program according to the invention.
Figure 14:
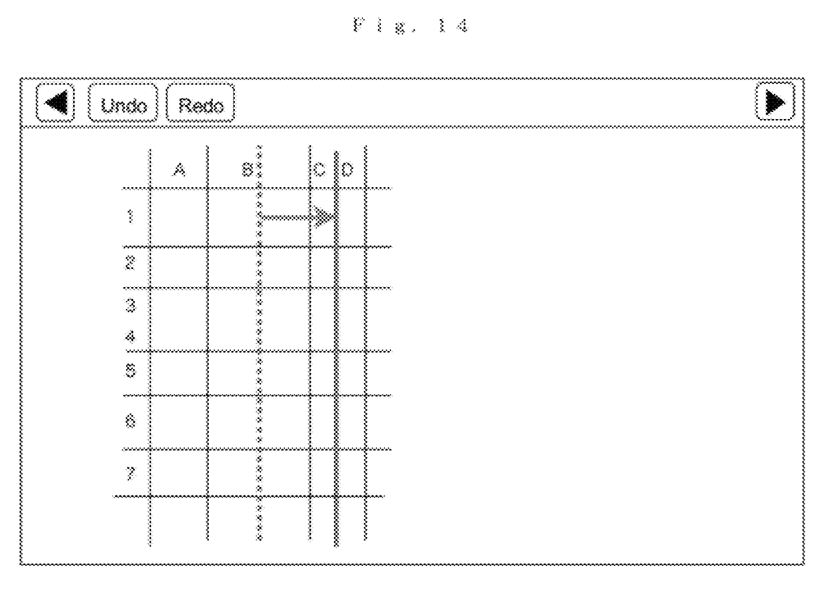
FIG. 14 is a view showing a state in which the ruled line is moved in order to change a position of the column of the spreadsheet in accordance with the spreadsheet control program according to the invention.

In examples of FIGS. 12 to 14, a ruled line breaking B and C columns is selected and moved in parallel in a rightward direction. As shown in the example of FIG. 12, when it is detected that a fingertip or the like carrying out the dragging is separated from the touch screen 20 in a position which has not reached a ruled line breaking C and D columns and the movement is thus ended, a processing for changing widths of the B and C columns is executed in such a manner that the ruled line is moved to the same position. The result of the processing is transferred to the spreadsheet calculating portion 12 and is reflected in the file of the spreadsheet.

When the ruled line is further moved, it is detected that the fingertip or the like carrying out the dragging is separated from the touch screen 20 in a position for an overlap with a ruled line breaking the C and D columns and the movement is thus ended, two columns are unified into a single column to change the width of the B column corresponding to a position to which the ruled line is moved (the width of the B column may be recovered into an original width) as shown in the example of FIG. 13, and there is executed a processing for erasing or changing an input value of a cell unified correspondingly. The result of the processing is transferred to the spreadsheet calculating portion 12 and is reflected in the file of the spreadsheet.

A way for treating the input value of the cell by unifying two columns into a single column, that is, unifying two cells into a single cell is not particularly restricted. For instance, in the case of the example in FIG. 13, an input value of a cell in the C column before the unification may be erased or an input value of a cell in the D column may be erased. If the input value is not an arithmetic expression, moreover, a line feed may be carried out in the cell to display the input value in the B column and the input value in the C column in two-stage writing.

When the ruled line is further moved, it is detected that the fingertip or the like carrying out the dragging is separated from the touch screen 20 in a position placed beyond the ruled line breaking the C and D columns and the movement is thus ended, a processing for changing the widths of the B and C columns is executed in such a manner that the ruled line is moved to the same position as shown in the example of FIG. 14. In this case, a position of the C column is moved to a part of an original position in which the D column is present so that the numbering and the display position of the input value of the cell are also changed. The result of the processing is transferred to the spreadsheet calculating portion 12 and is reflected in the file of the spreadsheet.

With reference to FIGS. 12 to 14, the description has been given to the case in which the selected ruled line is a vertical line and is moved in parallel in the transverse direction. In the case in which the selected ruled line is a transverse line and is moved in parallel in a vertical direction, however, a change in a height of a row, a unification of the row or the like is executed in the same manner as the case of a column.

Figure 15:
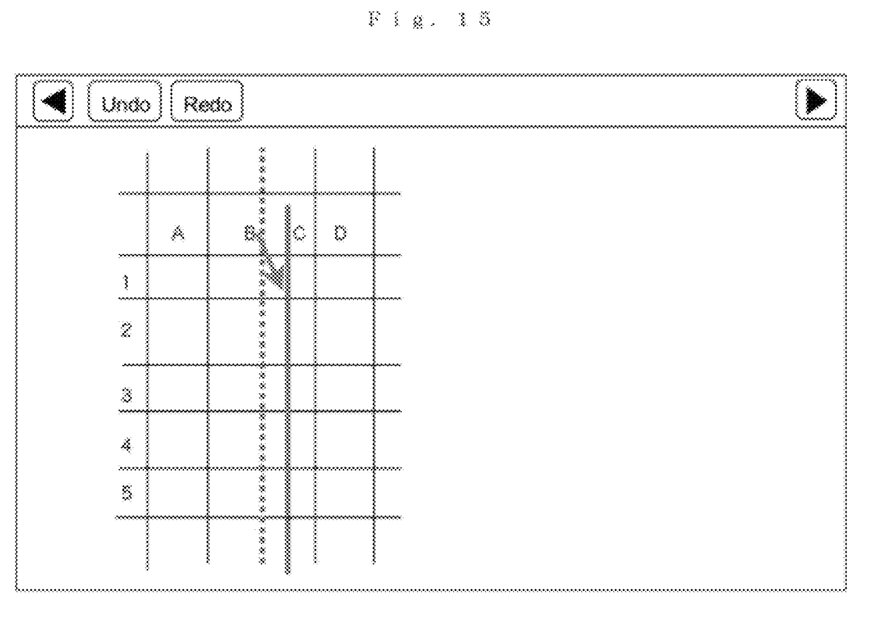
FIG. 15 is a view showing a state in which the ruled line is moved in order to change a numbering position of the column of the spreadsheet, thereby shifting a position of the spreadsheet in accordance with the spreadsheet control program according to the invention.

FIG. 15 shows a state in which the selected ruled line is not moved in parallel as in FIGS. 12 to 14 but is moved obliquely or along a ruled line. If the selected ruled line is a vertical line, there is executed a processing for shifting a row subjected to numbering for a column in a downward direction to change numbering for a row and varying a display position of an input value of a cell as in the example of FIG. 15 when it is detected that a fingertip or the like carrying out the dragging is separated from the touch screen 20 in a position in which an upper end of the ruled line is moved beyond the row subjected to the numbering for a column and the movement is thus ended. The result of the processing is transferred to the spreadsheet calculating portion 12 and is reflected in the file of the spreadsheet.

In the same manner as in the case in which the selected ruled line is a transverse line, when it is detected that the fingertip or the like carrying out the dragging is separated from the touch screen 20 in a position in which a left end of the ruled line is moved beyond a column subjected to the numbering for a row and the movement is thus ended, there is executed a processing for shifting the column subjected to the numbering for a row in a rightward direction to change the numbering for a column and varying a display position of an input value of a cell. The result of the processing is transferred to the spreadsheet calculating portion 12 and is reflected in the file of the spreadsheet.

This application is based on Japanese Patent Application No. 2011-044554 filed on Mar. 1, 2011, the contents of which are incorporated hereinto by reference.

What is claimed is:

1. A spreadsheet control program stored on a non-transitory computer readable medium for controlling a spreadsheet in a computer including a touch screen, the program causing the computer to execute:
   a line detecting step of detecting a line drawn on a predetermined window of the touch screen;
   a ruled line recognizing step of recognizing the line detected at the line detecting step as a ruled line which is parallel with a transverse or vertical ruled line corresponding to a row or column of the spreadsheet to be displayed on the window;
   a cell setting step of setting, to a single cell in the spreadsheet, a region in which a square formed by intersection points of the ruled lines recognized at the ruled line recognizing step is displayed when the square is formed; and
   an input value accepting step of accepting data specifying the region set to the cell at the cell setting step as a value input to the cell over the spreadsheet when the data are input;
   wherein when a height or width of a square formed newly is different from that of an corresponding to the square formed newly is set to be the same as that of the predetermined range, on the other hand, when a height or width of the square formed newly is different from that of the adjacent cell which is previously set within the predetermined range, a height or width of the cell corresponding to the square formed newly is set to be the same as that of the adjacent cell which is previously set at the cell setting step.

2. The spreadsheet control program according to claim 1, wherein the computer is caused to execute: a deleting line detecting step of detecting a deleting line which is drawn to transversely or vertically cross a region set to be a cell on the spreadsheet to be displayed on the window and meets a predetermined condition; and a deleting step of deleting a row belonging to the cell when the deleting line detected at the deleting line detecting step is drawn to transversely cross the region set to be the cell, and a column belonging to the cell when the deleting line is drawn to vertically cross the region set to be the cell.

3. The spreadsheet control program according to claim 2, wherein a predetermined condition for the deleting line to be detected at the deleting line detecting step indicates a line drawn on a region corresponding to cells belonging to an identical row or column, and a wavy line covering a range of at least a predetermined ratio of a height of the cell and at least a predetermined number of cells in a total number of cells in the row if the cells belong to the identical row and a wavy line covering a range of at least a predetermined ratio of a width of the cell and at least a predetermined number of cells in a total number of cells in the column if the cells belong to the identical column.

4. The spreadsheet control program according to claim 1, wherein the computer is caused to execute: a dividing line detecting step of detecting a dividing line which is drawn to transversely or vertically cross a region set to be a cell on the spreadsheet to be displayed on the window and meets a predetermined condition; and a cell dividing step of dividing a single cell in which the dividing line is drawn over the region at the dividing line detecting step into two cells including a cell which takes over a value input to the single cell.

5. The spreadsheet control program according to claim 4, wherein the predetermined condition for the dividing line to be detected at the dividing line detecting step indicates a line drawn on a region corresponding to cells belonging to an identical row or column, and a straight line drawn from the cell subjected to numbering for a row to the cell on a most end at a reverse side if the cells belong to the identical row and a straight line drawn from the cell subjected to numbering for a column to the cell on a most end at a reverse side if the cells belong to the identical column.

6. The spreadsheet control program according to claim 1, wherein the computer is caused to execute: a ruled line selecting step of accepting a selection of a ruled line breaking a row or column of a spreadsheet displayed on the window; and a cell unifying step of unifying two cells broken through a first ruled line accepted to be selected at the ruled line selecting step into a single cell when detecting that the first ruled line is moved to a position for an overlap with a second ruled line which is adjacent thereto.

7. The spreadsheet control program according to claim 1, wherein the computer is caused to execute: a ruled line selecting step of accepting a selection of a ruled line breaking a row or column of a spreadsheet displayed on the window; and a cell changing step of changing a height of a cell and numbering for a row if a first ruled line accepted to be selected at the ruled line selecting step is a transverse line and changing a width of the cell and numbering for a column if the first ruled line is a vertical line when detecting that the first ruled line is moved to a position placed beyond a second ruled line which is adjacent thereto.

8. The spreadsheet control program according to claim 1, wherein the computer is caused to execute: a ruled line selecting step of accepting a selection of a ruled line breaking a row or column of a spreadsheet displayed on the window; and a numbering changing step of shifting a column subjected to numbering for a row in a rightward direction to change numbering for a column when detecting that a left end of a ruled line accepted to be selected at the ruled line selecting step is moved beyond the column subjected to the numbering for a row if the ruled line is a transverse line, and shifting the row subjected to the numbering for a column in a downward direction to change the numbering for a row when detecting that an upper end of the ruled line accepted to be selected at the ruled line selecting step is moved beyond the row subjected to the numbering for a column if the ruled line is a vertical line.

9. A spreadsheet control apparatus comprising:
a touch screen capable of inputting/outputting data;
line detecting means for detecting a line which is drawn on a predetermined window of the touch screen;
ruled line recognizing means for recognizing the line detected by the line detecting means as a ruled line which is parallel with a transverse or vertical ruled line corresponding to a row or column of a spreadsheet to be displayed on the window;
cell setting means for setting, to a single cell in the spreadsheet, a region in which a square formed by intersection points of the ruled lines recognized by the ruled line recognizing means is displayed when the square is formed; and
input value accepting means for accepting data specifying the region set to the cell by the cell setting means as a value which is input to the cell over the spreadsheet when the data are input;
adjacent cell which is previously set beyond a predetermined range, a height or width of a cell corresponding to the square formed newly is set to be the same as that of the predetermined range, on the other hand, when a height or width of the square formed newly is different from that of the adjacent cell which is previously set within the predetermined range, a height or width of the cell corresponding to the square formed newly is set to be the same as that of the adjacent cell which is previously set by the cell setting means.

10. A method of controlling a spreadsheet through a computer including a touch screen, comprising:
a line detecting step of causing the computer to detect a line drawn on a predetermined window of the touch screen;
a ruled line recognizing step of causing the computer to recognize the line detected at the line detecting step as a ruled line which is parallel with a transverse or vertical ruled line corresponding to a row or column of a spreadsheet to be displayed on the window;
a cell setting step of causing the computer to set, to a single cell in the spreadsheet, a region in which a square formed by intersection points of the ruled lines recognized at the ruled line recognizing step is displayed when the square is formed; and
an input value accepting step of causing the computer to accept data specifying the region set to the cell at the cell setting step as a value input to the cell over the spreadsheet when the data are input;
wherein when a height or width of a square formed newly is different from that of an adjacent cell which is previously set beyond a predetermined range, a height or width of a cell corresponding to the square formed newly is set to be the same as that of the predetermined that of the adjacent cell which is previously set within the predetermined range, a height or width of the cell corresponding to the square formed newly is set to be the same as that of the adjacent cell which is previously set by the cell setting means.

* * * * *